United States Patent [19]

Haseley et al.

[11] Patent Number: 5,610,339

[45] Date of Patent: Mar. 11, 1997

[54] METHOD FOR COLLECTING MACHINE VIBRATION DATA

[75] Inventors: Robert K. Haseley, Mooresville; Paul A. Kirkpatrick, Charlotte, both of N.C.

[73] Assignee: Ingersoll-Rand Company, Woodcliff Lake, N.J.

[21] Appl. No.: 612,196

[22] Filed: Mar. 6, 1996

Related U.S. Application Data

[63] Continuation-in-part of Ser. No. 326,410, Oct. 20, 1994, abandoned.

[51] Int. Cl.⁶ .................................................. G01H 11/00
[52] U.S. Cl. .................... 73/660; 73/659; 364/508
[58] Field of Search .................... 73/659, 660, 1 DV; 364/508; 418/2

[56] References Cited

U.S. PATENT DOCUMENTS

| Re. 31,247 | 5/1983 | Johnstone | 364/474 |
|---|---|---|---|
| 4,352,293 | 10/1982 | Kurihara et al. | 73/660 |
| 4,424,709 | 1/1984 | Meier, Jr. et al. | 73/117.3 |
| 4,429,578 | 2/1984 | Darrel et al. | 73/660 |
| 4,437,163 | 3/1984 | Kurihara et al. | 364/508 |
| 4,520,674 | 6/1985 | Canada et al. | 73/660 |
| 4,559,828 | 12/1985 | Liszka | 73/658 |
| 4,758,964 | 7/1988 | Bittner et al. | 364/508 |
| 4,885,707 | 12/1989 | Nichol et al. | 364/551.01 |
| 4,980,844 | 12/1990 | Demjanenko et al. | 73/660 |
| 5,115,671 | 5/1992 | Hicho | 73/660 |
| 5,210,704 | 5/1993 | Husseiny | 364/551.01 |

OTHER PUBLICATIONS

Vibration Analysis II, Public Seminar, Developed By James E. Berry, P.E., Titled: Concentrated Vibration Signature Analysis And Related Condition Monitoring Techniques.

Vibration Analysis III, Public Seminer, Developed By James E. Berry, P.E., Titled: Introduction To Special Vibration Diagnostic Techniques And How To Properly Specify Narrowband Spectral Envelope Alarms.

Vibration Analysis Advanced, Public Seminar Developed By James E. Berry, P.E., Titled: Advanced Vibration Diagnostic And Reduction Techniques.

*Primary Examiner*—John E. Chapman
*Attorney, Agent, or Firm*—Michael M. Gnibus

[57] ABSTRACT

A method is provided for determining and for predicting the present and future condition of a machine having at least one rotative element. The method includes an initial step of storing in memory a predetermined logic routine and at least one predetermined key frequency of the at least one rotative element of the machine. The machine is operated in a predetermined operational state and, during operation, the mechanical motion of the at least one rotative element is sensed by at least one sensor. The sensed mechanical motion of the at least one rotative element is converted into a corresponding electrical signal, and the predetermined operational state of the machine is correlated with a corresponding electrical signal. The corresponding electrical signal is inputted into corresponding vibration data by utilizing the predetermined logic routine. Then, the corresponding vibration data is compared with the at least one predetermined key frequency to predict the present and future condition of the machine. A control signal is transmitted to the machine, in order to control the machine, in response to the present condition and the predicted future condition of the machine.

10 Claims, 4 Drawing Sheets

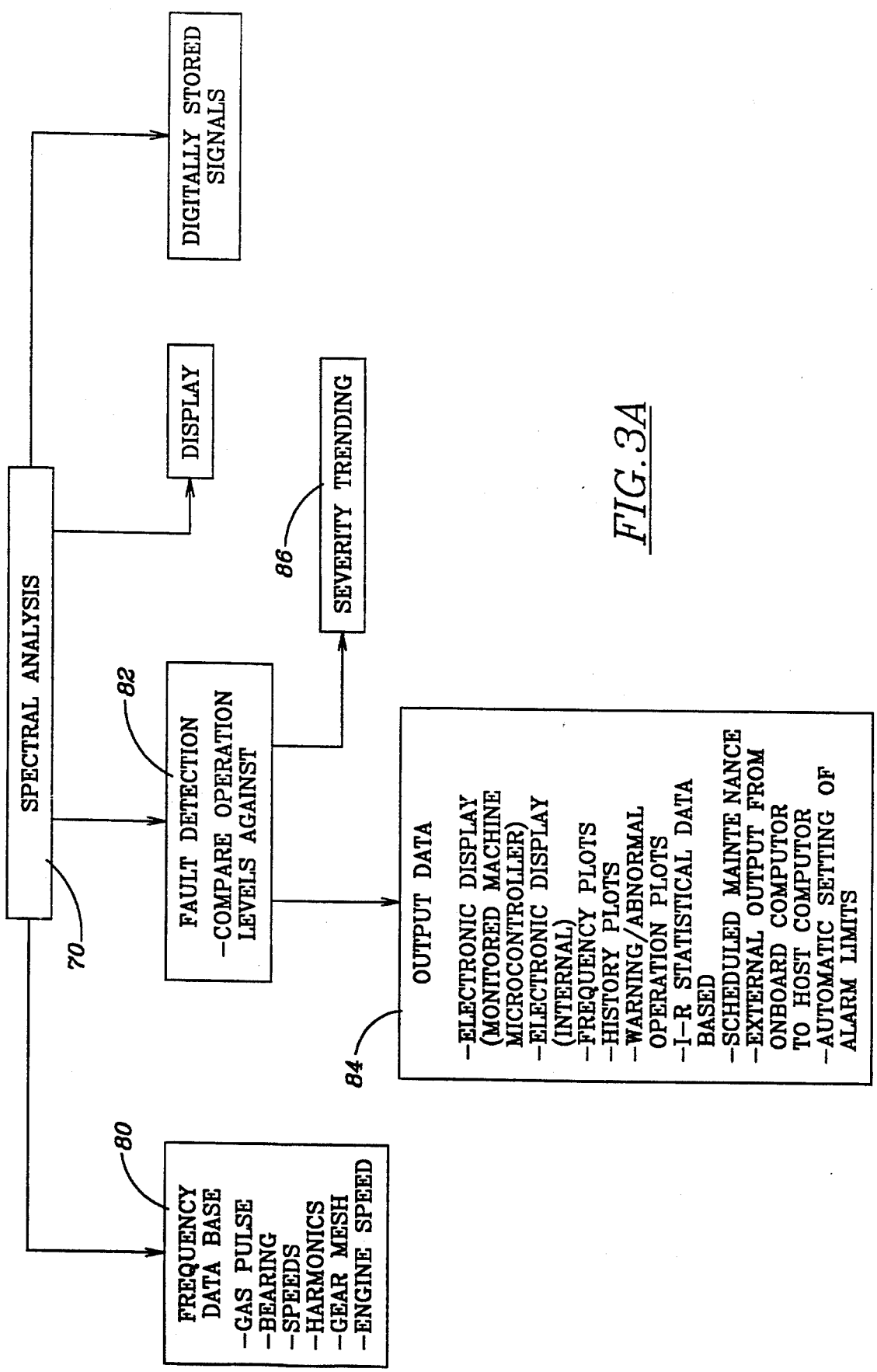

METHOD FOR COLLECTING MACHINE VIBRATION DATA

This application is a continuation-in-part of application Ser. No. 08/326,410, filed Oct. 20, 1994, abandoned.

BACKGROUND OF THE INVENTION

This invention generally relates to a method for collecting machine vibration data, and more particularly to a method for analyzing vibration signatures to predict and to detect changes in machinery condition.

By design, machinery having rotative elements, which are couplingly connected, experience vibratory motion. This vibratory motion may be generated by such rotative elements as the following: machine bearings, such as bearing races, or defective ball bearings; misalignment of machine assemblies, such as gears, motors, or shafts; and imbalance of machine assemblies, such as motors, rotors, gears, pistons and fans. The vibratory motion of such machine assemblies may be expressed in the form of a vibration signature, vibration footprint or "footprint", which may be graphically illustrated.

The present and future condition of machinery may be determined and predicted by analyzing predetermined vibration signatures of individual machinery. Determining the present and future condition of machinery is essential for maintaining such machinery on line and capable of contributing to an essential manufacturing process. The machinery to be studied may include rotating type machinery, such as but not limited to rotary screw type air compressors. Such rotary screw type air compressors typically supply the entire pneumatic requirements for a manufacturing facility. In such an example, if the rotary screw air compressors fail in their essential function, production at the manufacturing facility will most likely cease until such time as the fault condition is remedied or a back up pneumatic supply is located. This, of course, may cause a great loss of revenue for the affected manufacturing facility. Ideally, a potential fault condition of a machine should be identified as early as possible to permit a facility manager to schedule "down" time and machine maintenance in a cost effective manner.

In an effort to avoid the loss of revenue caused by "down" equipment, manufacturing facility managers have, in the past, employed independent firms that specialize in the field of predictive vibration monitoring of machinery. It is the purpose of such firms to supply personnel to a manufacturing facility for the purpose of performing on-site vibration monitoring. As is well known, in order to effectively perform predictive vibration monitoring of machinery, the "normal" vibration signatures of all the rotative components must be known before predictive vibration monitoring is performed. These "normal" vibration signatures of the rotative components serve as a benchmark from which to evaluate all other vibration signatures. Notwithstanding the foregoing, typically such independent firms performing predictive vibration monitoring do not know the "normal" vibration signatures of the machines to be monitored. Without the knowledge of such "normal" vibration signatures, predictive vibration monitoring programs may produce extremely inaccurate results, which is a problem presently plaguing this field. Such inaccurate results cause unnecessary repair of machines that are otherwise in sound operating condition, and cause the owners of such machines to file meritless warranty claims against the manufacturer of such machines.

As may be appreciated by one skilled in the art, any collection of vibration data for the purpose of predictive vibration monitoring must be performed under equal machine conditions to achieve accurate results. Present methods of collecting vibration data accomplish such data collection absent any accurate correlation to the running state of the monitored machine. For example, on a predetermined date, vibration data may be collected for a compressor under compressor loaded conditions. Thereafter vibration data may be collected for a compressor under compressor unloaded conditions. Inaccuracy will occur if the dissimilar collected vibration data is compared to predict the present and future condition of the monitored machine.

In addition to the foregoing, present methods of vibration data collection do not permit any integration between the vibration monitoring and a microprocessor based control system of the monitored machine. This lack of integration prevents any continuous logging of machine vibration data which would permit a significantly more accurate analysis of any gathered vibration data.

The foregoing illustrates limitations known to exist in present methods for collecting vibration data for the purpose of predicting and detecting changes in machinery condition. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for analyzing vibration signatures of machinery having at least one rotative element to predict and to detect changes in the condition of the machinery. The method comprises the following steps: permanently installing the machine to be monitored at an operation site for the machine; operating the machine to be monitored; storing in a memory a predetermined logic routine, and at least one predetermined key frequency of the at least one rotative element of the machine to be monitored; sensing the mechanical motion of the at least one rotative element during operation of the machine; converting the mechanical motion of the at least one rotative element into a corresponding electrical signal; correlating a predetermined operational state of the monitored machine with a corresponding electrical signal; inputting the corresponding electrical signal to a processor; storing in a memory at least one corresponding electrical signal; processing the corresponding electrical signal into corresponding vibration data of the monitored machine by utilizing the predetermined logic routine; and comparing the corresponding vibration data with the at least one predetermined key frequency to predict the present and future condition of the at least one rotative element.

The foregoing and other aspects will become apparent from the following detailed description of the invention when considered in conjunction with the accompanying drawing figures.

BRIEF DESCRIPTION OF THE DRAWING FIGURES

FIG. 3A is a chart highlighting the spectral analysis step 70 of FIG. 3.

DETAILED DESCRIPTION

Figure 1:
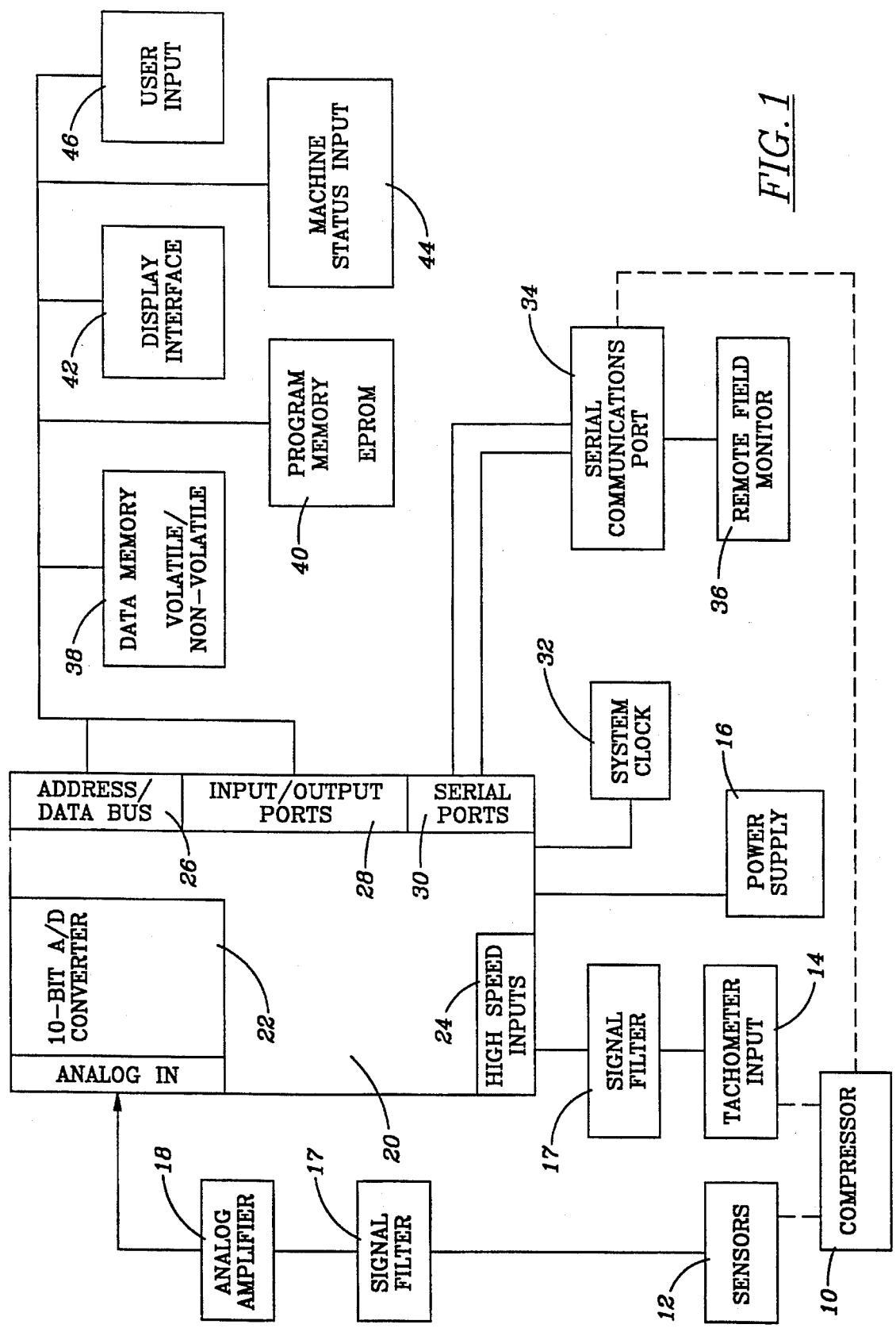
FIG. 1 is a functional block diagram of a vibration monitoring system in accordance with the teachings of the present invention.

Referring now to the drawings, wherein similar reference characters designate corresponding parts throughout the several views, FIG. 1 illustrates a functional block diagram of a vibration monitoring system in accordance with the teachings of the present invention. The vibration monitoring system of the present invention may be used with any type machine, such as but not limited to the following: gas compressors, including centrifugal compressors and rotary screw air compressors; pumps; blowers; turbines; engines or any other type machine having rotative components which have some degree of vibratory motion which generate characteristic vibration signatures.

Generally illustrated at 10 is a machine to be monitored, which in the embodiment illustrated is a rotary screw type air compressor. One or more sensors 12 communicate with the compressor 10. The sensors 12 are of the type which convert mechanical motion or energy into electrical signals. For example, the sensors 12 may be proximity probes, accelerometers or any other type sensors which are used in industrial applications to measure vibration. The sensors 12 are attached to the compressor in predetermined locations to be monitored. For example, the sensors 12 may be attached to the compressor 10 in such a manner to analyze the vibratory motion of machine bearings (e.g. bearing races, or defective ball bearings), gears, motors, shafts, pistons or fans, for example. A tachometer input is shown at 14 which is a magnetic type pick-up, and which is designed to determine rotational speed of a predetermined compressor element. A power supply 16 supplies the requisite electrical power to the vibration monitoring system. Signal filters are connected to the sensors 12 and the tachometer input 14 to precondition the electrical signals which are generated therefrom, and to suppress noise or other electrical magnetic interference. An optional analog amplifier is provided at 18 which is connected to the sensors 12, by way of the signal filter 17, and to a microcontroller 20. Analog amplifier 18 is required only if the signal generated by a sensor 12 is below a predetermined threshold voltage, such as 0 volts, for example. Typically, accelerometers produce such a voltage below 0 volts and require amplification.

In the embodiment of the vibration monitoring system described herein, the microcontroller 20 is a 16 bit unit. The microcontroller 20 should be of a type which is able to perform, at a minimum, the following functions: collect data quickly; analyze data quickly by employing a signal analysis algorithm, such as a fast Fourier transform algorithm (FFT algorithm); quickly store and move data between memory locations; and perform floating point calculations. A microcontroller which is known to be capable of performing these functions is an Intel® 80C196 series microcontroller. Signals from the sensors 12 are inputted to the microcontroller 20 through an A/D converter 22, such as a 10-bit type A/D converter, for example. The A/D converter operates to convert the real world analog signals which are generated by the sensors 12 to a digital format to be processed by the microcontroller 20. Signals from the tachometer input 14 are inputted to the microcontroller 20 through a high speed input 24.

The microcontroller outputs to an address data bus 26, input/output ports 28 and a serial port 30. The address data bus 26 is required to permit the microcontroller to communicate to peripherals, such as but not limited to a data memory 38, program memory 40, display interface 42, machine status input 44, and a user input 46, all of which will be described in further detail hereinafter. Input/output port 28 typically comprises digital inputs or outputs which may control such hardware functions as controlling a backlight on a display interface, or controlling light emitting diodes, for example. Serial port 30 permits the microcontroller 20 to communicate with another central processing unit or microcontroller, such as a microcontroller which may control operating functions of the compressor 10.

By way of the serial port 30, a microprocessor controlled machine, such as a microprocessor controlled compressor 10, may be integrated with the vibration monitoring system of the present invention. Such integration permits the vibration monitoring system to precisely correlate the state of the operating machine with the vibration data collected. Also, it is contemplated by the teachings herein that action commands may be generated by the microcontroller 20 and outputted through serial port 30 to the monitored machine. For example, if the analyzed vibration signature would indicate an impending fault condition, a command signal may be outputted to the monitored machine by the microcontroller 20. This command signal may be of the type to control operations of the monitored machine or to cause alarm information to be displayed by the monitored machine. More than one serial port 30 may be included in the vibration monitoring system, if for example, the system is to be employed at a remote site. In such an embodiment of the present invention, a serial port 30 would be dedicated to the monitored machine and a second serial port would be employed to provide for communications between a remote field monitor 36 and the vibration monitoring system. Communications with the remote field monitor 36 would be accomplished via a modem which would permit data transfer to a remote site by way of cellular communications, radio frequency communications or telephone communications, for example.

The microcontroller 20 communicates with a system clock 32. A serial communications port 34 communicates with the one or more serial ports 30. The serial communications port may be either a RS485 or RS232 type communication port, however, an RS485 type serial communications port is preferred due to being more robust in an industrial environment. The serial communications port 34 is linked with a machine to be monitored, such as the compressor 10, and a remote field monitor 36.

Figure 2:
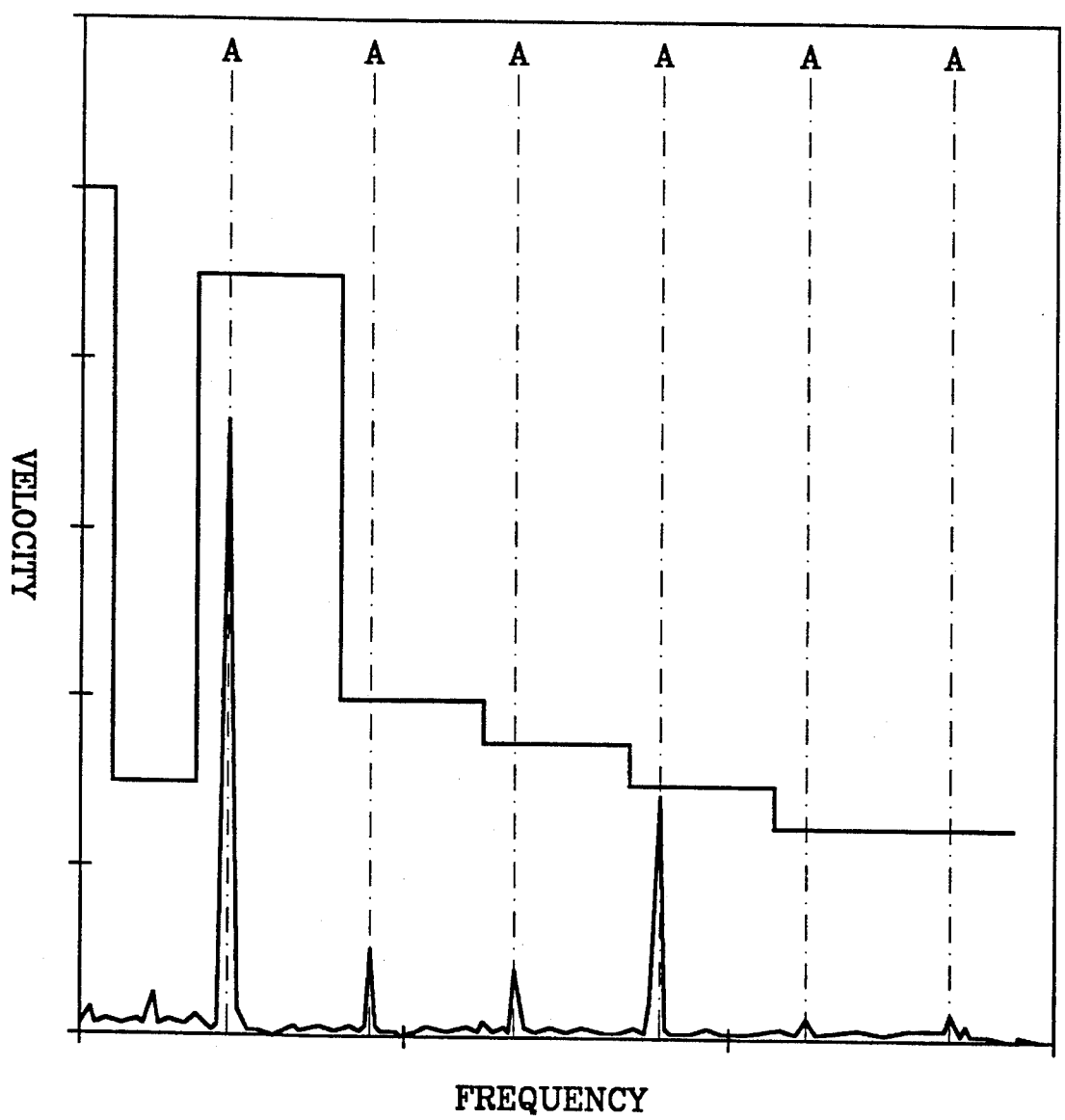
FIG. 2 is a predetermined spectral display or vibration signature (Frequency v. Velocity) for a machine.

The data memory 38 is a random access type memory (RAM) having both a volatile and a non-volatile memory component. Stored in non-volatile RAM is a digitized footprint or vibration signature of the machine to be monitored (e.g. FIG. 2). FIG. 2 illustrates a typical footrprint or vibration signature and shows the vibration frequency for the rotative element and associated amplitude of the vibration frequency at a respective velocity (along outside ordinate) of the rotative element.

The amplitude of the vibration frequency is compared to the amplitude of the corresponding frequency obtained during the trending step to be described hereinafter, to thereby predict present and future condition of the compressor. This footprint may be obtained initially at the facility at which the monitored machine is assembled, and/or the footprint may be obtained upon installation of the machine at a predetermined manufacturing site, as will be explained in further detail hereinafter. Also, stored in non-volatile RAM are predetermined values for all the key frequencies of the rotative elements of the machine to be monitored. These key frequency values will serve as a benchmark against which the microcontroller 20 will compare collected vibration signatures. By using an actual footprint of the machine to be monitored, and actual key frequencies of rotative elements, extremely accurate predictive vibration monitoring may be achieved.

The program memory 40, such as an erasable programmable read only memory (EPROM), stores the program for controlling a fast Fourier transform algorithm. The display interface 42 may include a liquid crystal display, a printer, cathode ray tube, or any other similar suitable display apparatus for visually depicting a vibration signature, such as the vibration signature illustrated in FIG. 2. The machine status input 44 provides for an interface which permits the microcontroller 20 to correlate the state of the machine to be monitored with collected predetermined vibration signatures from a machine which is not equipped with a microprocessor based controller. More particularly, in such a machine which is not equipped with a microprocessor based controller, the microcontroller 20 is unable to correlate collected vibration signatures with a predetermined machine state. For example, a rotary screw compressor may be operating in such states as "loaded", "unloaded", or "modulating". The machine status input 44 permits the integration of non-microprocessor controlled machines with the microcontroller 20 to provide for accurate predictive vibration monitoring in those instances. User input setup 46 is an apparatus for permitting a user to control the vibration monitoring system. For example, the user input setup may be a membrane panel with appropriate input type switches, or any other suitable type human/machine interface type apparatuses.

FIG. 2 is an actual footprint or vibration signature which has been obtained under a known machine state, and from an individual sensor 12, having a known, predetermined location. Each sensor 12 provides vibration data to produce a single vibration signature. Overlying each vibration signature is an alarm level. The alarm level is employed by the vibration monitoring system to indicate predetermined maximum levels above which machine fault conditions may occur to the monitored machine.

Figure 3:
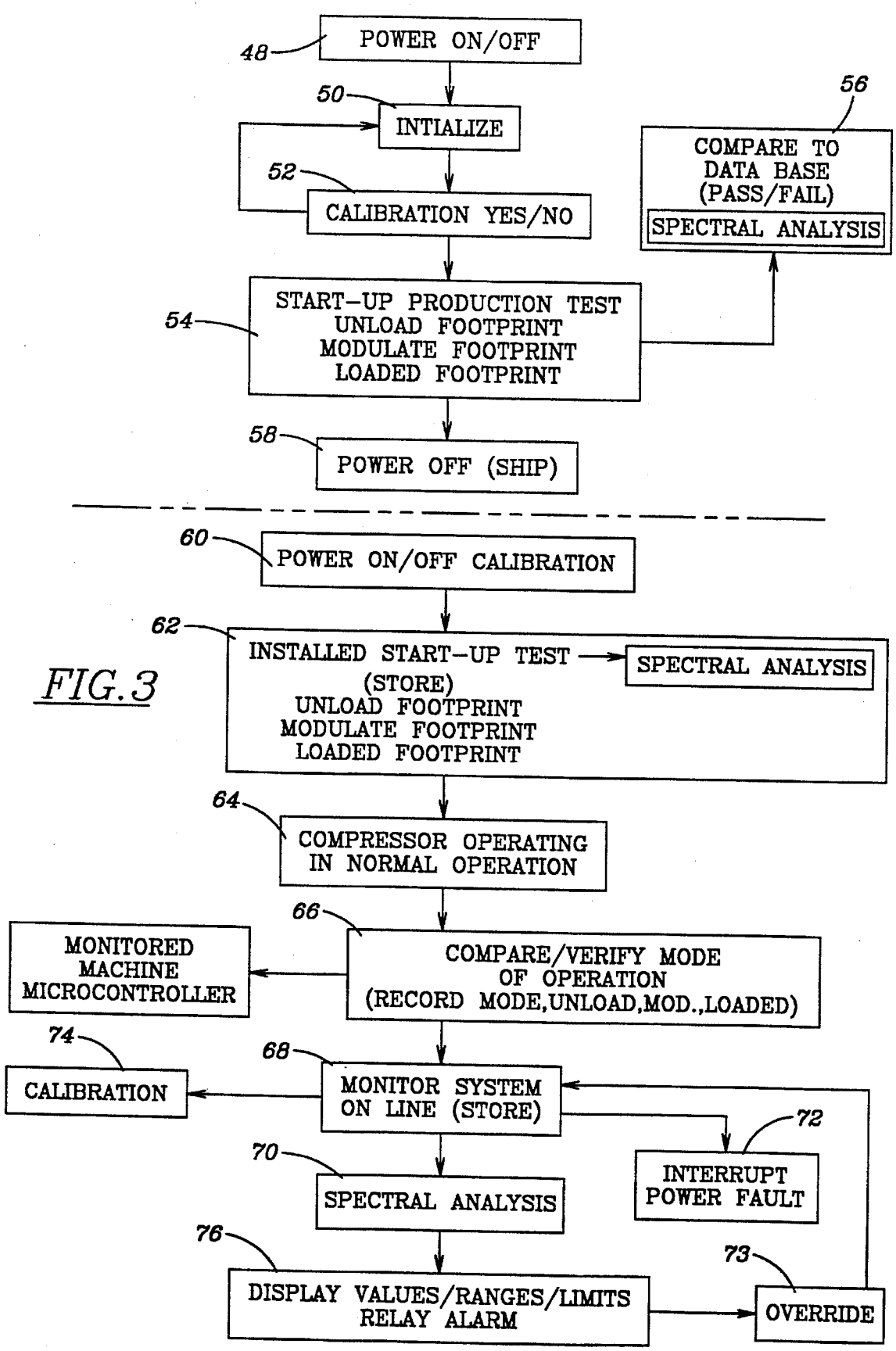
FIG. 3 is a chart depicting operation logic employed by the system of the present invention.

The requisite operational steps employed by the vibration monitoring apparatus of the present invention are detailed in FIG. 3. As should be understood, the vibration monitoring system of the present invention may be installed in a newly manufactured compressor as original equipment. Alternatively, the vibration monitoring system may be supplied as a retrofit assembly in compressors already existing at site locations. The operational steps detailed in FIG. 3 are based upon an original equipment type vibration monitoring system.

During the assembly of a newly manufactured machine, such as the rotary screw air compressor 10, electrical power is applied to power supply 16 at block 48. Thereafter, the microcontroller 20 is initialized at block 50. During initialization, a predetermined logic routine is executed which accomplishes such tasks as determining the software revision resident in the program memory 40; identifying the machine to be monitored and the rotative elements to be monitored; identifying the number of sensors present within the vibration monitoring system; and determining the state of the various sub-assemblies of the vibration monitoring system, such as but not limited to, the data memory 38, the program memory 40, the display interface 42, and the microcontroller 20. Upon completion of the initialization at block 50, a calibration test is accomplished at block 52.

Calibration data and a predetermined calibration subroutine are retrieved by the microcontroller 20 from the data memory 38. If the calibration test is passed, operational step 52 is advanced to step 54 where a start-up production test is performed upon the machine to be monitored. If the calibration test is failed, the microcontroller 20 returns the system logic to the initialization step at 50. The calibration step employs a predetermined calibration circuit containing a built in signal to simulate signals generated by the sensors 12 to the microcontroller 20 for self calibrating or zero offsetting purposes. The calibration step 52 also includes the following: determination of the status of the power supply 16 and the excitation voltage to the sensors 12; determination of the status of sensor connections to confirm the number of sensors employed by the vibration monitoring system; and determination of the status of the outputs of the vibration monitoring system.

At the manufacturing facility of the machine to be monitored, a start-up production test is accomplished which is represented at block 54. The start-up production test is performed during operation of the machine to be monitored, during which initial vibration data is collected. It is the purpose of the start-up production test to compile the initial vibration data into various benchmark footprints for different operating states of the machine to be monitored. For example, in the case of a rotary screw compressor, a footprint is established for an "unloaded" state, a "loaded" state, or a "modulating" type state, for example. The various footprints are then digitized and stored within the data memory 38. At step 56 the initial vibration data is compared to the key frequencies of the rotative elements of the machine to be monitored, which have also been stored within the data memory 38. The data analysis which is accomplished at step 56 determines whether the initial vibration footprints are within the acceptable frequency ranges of the rotative elements of the machine to be monitored. If the initial vibration footprints are within such acceptable frequency ranges of the rotative elements, the machine is determined to be suitable for shipment which is accomplished at block 58. Conversely, if the initial vibration footprints are determined to be out of range, the machine is determined to be unfit for shipment, and the machine is inspected to locate the source of the fault condition.

Upon arriving at an operational site, and after the machine to be monitored is permanently installed, power is supplied to the machine and the machine is calibrated at step 60. Thereafter, an installed start-up test is performed at step 62. The installed start-up test is similar to the start-up production test. The purpose of the installed start-up test is to compile initial benchmark vibration data for the installed machine to be monitored. As should be understood, when a machine, such as a rotary screw air compressor is installed, floor mounting systems, absorption pads, and/or vibration mounts may alter a machine's vibration signature. Therefore, predictive vibration monitoring is based upon the vibration data compiled by the installed start-up test. As with the start-up production test, the vibration data for the installed start-up test is digitized and stored within the data memory 38. Also at step 62, the initial vibration data is compared to the key frequencies of the rotative elements which were previously stored within the data memory. If the vibration footprints for the installed machine are within the acceptable frequency ranges of the rotative elements, the machine is determined to be suitable for operation, which is represented at step 64. Conversely, if the initial vibration footprints are determined to be out of range, the machine is inspected to locate the source of the fault condition.

Vibration data is collected at user selected time intervals at step 66. Throughout the collection of vibration data, the system microcontroller 20 interacts with a microcontroller of the compressor 10 to thereby correlate the machine state with the vibration data collected. In the situation where the machine to be monitored is not equipped with a microcontroller, the microcontroller interacts with the machine status input 44 to correlate machine state with the vibration data collected. The collected vibration data is then stored at step 68 in the data memory 38 such that a spectral analysis, step 70, may be performed thereupon. At predetermined time intervals a calibration function is accomplished at step 74 similar to the calibration function accomplished at step 52. Additionally, at predetermined time intervals, an initialization function is accomplished at step 72 similar to step 50. Data obtained from the spectral analysis performed at steps 56, 62 and 70 may be displayed at step 76 by way of the display interface 42. Also, during operation of the monitored machine, commands may be provided at step 76 to control the operation of the monitored machine when the value of predetermined vibration data exceeds the stored key frequency values. An override is provided at step 73 to inhibit the transmission of alarm commands to the monitored machine during predetermined user selected time periods.

The spectral analysis performed at steps 56, 62 and 70 employs a fast Fourier transform algorithm to obtain a vibration signature from collected vibration data generated by signals from the sensors 12 and 14. This is accomplished by converting a real time domain signal and converting this signal to a frequency domain to permit predictive vibration monitoring. The fast Fourier transform algorithm is digitally controlled and permits predetermined frequencies of the rotative elements of the monitored machine to be isolated for analysis. In order to accurately perform predictive vibration monitoring, the vibration signatures generated by the fast Fourier transform algorithm are compared with the following: the benchmark vibration signatures stored in the data memory 38; the key frequency values for the rotative elements of the monitored machine which are stored in the data memory; and previously obtained vibration signatures. This routine for performing predictive vibration monitoring is generally referred to as "trending". The trending step is conducted on fixed intervals and is a periodic vibration status check for the compressor. During the trending operation, the compressor operational state is controlled by the processor. When it is time to initiate the trending step, the compressor is placed in a predetermined normal operating state. For example, the normal operating state may be when the compressor is fully loaded. It is important that the trending data be collected at the same compressor operating state so that an accurate trending assessment may be made.

While the compressor is in the normal operating state, vibration readings are taken and are processed and vibration footprints or signatures for the machine are generated. The vibration footprints are compared with the at least one key frequency value for the compressor and also are compared with any vibration signatures that were generated during previously conducted trending operations. These previously generated signatures were stored in memory during the previous trending steps. In this way, vibration trends are revealed and detected.

If based on the trending operation, a negative deviation from acceptable vibration footprint is revealed, the interval between trending operations may be decreased so that the vibration data is taken more frequently.

After the trending step is concluded, the machine is returned to its prior operating condition.

Additionally, the vibration tests 54 and 62 conducted before the machine is permanently installed and after the machine is permanently installed are conducted at the predetermined normal machine operating state. Turning to FIG. 3A, examples of the type of key frequencies which are stored within the data memory 38 are outlined in block 80, namely gas pulse frequencies and harmonics thereof, bearing frequencies, and gear mesh frequencies, for example. The spectral analysis performed at step 70 is utilized by the vibration monitoring system of the present invention to perform fault detection at step 82. The fault detection is accomplished by comparing the vibration signatures obtained during operation of the monitored machine with any suitable output data, such as that listed at step 84, or by comparing the vibration signatures with severity trending at step 86. For example, if an unaccounted for frequency rise occurs between two known gas pulse frequencies, a determination can be made as to the cause of such a frequency rise, such as a failing rotative component, for example.

While this invention has been illustrated and described in accordance with a preferred embodiment, it is recognized that variations and changes may be made therein without departing from the invention as set forth in the following claims.

Having described the invention, what is claimed is:

1. A method for predicting and for detecting the condition of a screw compressor having at least one rotative element, the method comprising the following steps:

storing in a memory a predetermined logic routine and at least one predetermined key frequency value of the at least one rotative element of the compressor;

trending, at regular intervals, to determine whether the compressor vibratory condition has changed, said trending comprised of the following steps:
operating the compressor in a predetermined operational state;
sensing the mechanical motion of the at least one rotative element during compressor operation;
converting the mechanical motion of the at least one rotative element into a corresponding electrical signal;
correlating the predetermined operational state of the screw compressor with the corresponding electrical signal;
inputting the corresponding electrical signal to a processor;
processing the corresponding electrical signal into corresponding vibration data of the compressor by utilizing the predetermined logic routine; and
analyzing the corresponding vibration data for trends with the at least one predetermined key frequency value of the at least one rotative element of the compressor and comparing the vibration data with any previously collected vibration data to determine the present condition and predict the future condition of the compressor;

decreasing the length of the regular interval between trending steps if the compressor experiences a negative deviation in the vibratory condition; and controlling the operation of the compressor in response to the determined present condition and predict the future condition of the compressor by sending a command signal from the processor to the compressor.

2. A method, as claimed in claim 1, and wherein the predetermined logic routine utilizes a fast Fourier transform algorithm to process the corresponding electrical signal into corresponding vibration data.

3. The method for predicting and detecting the condition of a screw compressor having at least one rotative element, as claimed in claim 1 further including the step of calibrating the processor at predetermined time intervals, while the compressor is operating.

4. The method for predicting and detecting the condition of a compressor having at least one rotative element, as claimed in claim 1 further including the step of initializing the processor at predetermined time intervals, while the compressor is operating.

5. The method for predicting and detecting the condition of a compressor having at least one rotative element, as claimed in claim 4, wherein at least one sensor is attached to the compressor, and the processor communicates with a data memory, a program memory and a display interface, and wherein the the method includes at least one of the following steps performed before the trending step: identifying the compressor to be monitored; identifying the at least one rotative element to be monitored; identifying the number of sensors; and determining the state of the data memory, the program memory, the display interface, and the processor.

6. A method for predicting and detecting changes in the vibratory condition of a screw compressor, which includes at least one rotative element, said at least one rotative element having at least one key frequency, the method for predicting and detecting changes in the vibratory condition of the screw compressor, comprising the following steps:

before permanently installing the screw compressor, collecting first vibration data for the screw compressor at a predetermined screw compressor operating state;

compiling the first vibration data into a corresponding benchmark footprint for the predetermined operating state of the screw compressor and comparing the first vibration data with the key frequency of the at least one rotative element to determine if the screw compressor is in a desired vibratory operating condition;

permanently installing the screw compressor at an operation site;

storing in a memory a predetermined logic routine, which includes a fast Fourier transform algorithm, and at least one of the key frequency value of the at least one rotative element of the screw compressor;

collecting second vibration data for the at least one rotative element at the predetermined compressor operating state;

compiling the second vibration data into a corresponding second benchmark footprint for the predetermined operating state of the compressor and comparing the second vibration data with the stored at least one key frequency value of the at least one rotative element to determine if the compressor is in a desired vibratory condition;

trending, at regular intervals, to determine whether the compressor vibratory condition has changed, said trending comprised of the following steps:

switching the compressor from an actual compressor operating state and operating the screw compressor in the predetermined operating state;

sensing the mechanical motion of the at least one rotative element during compressor operation in the predetermined operating state;

converting the mechanical motion of the at least one rotative element into a corresponding electrical signal;

correlating the predetermined operating state of the compressor with the corresponding electrical signal;

inputting the corresponding electrical signal to a processor;

processing the corresponding electrical signal into corresponding vibration data of the compressor by utilizing the predetermined logic routine;

collecting vibration data of the compressor by storing in a memory the corresponding vibration data; and comparing the corresponding vibration data with the at least one predetermined key frequency value of the at least one rotative element of the machine and any vibration data previously collected during a previously executed trending step and stored in memory, to highlight trends in the vibratory condition of the machine and thereby determine the present condition and predict the future condition of the compressor;

decreasing the length of the regular interval between trending steps if the compressor experiences a negative deviation in the vibratory condition;

returning the compressor to the actual compressor operating state; and controlling the operation of the compressor in response to the determined present condition and the predicted future condition of the compressor by outputting a command signal from the processor to the compressor, while the compressor is operating.

7. The method for predicting and detecting the condition of a compressor having at least one rotative element, as claimed in claim 6, the compressor further including at least one sensor connected to the compressor by at least one sensor connection, the processor including a power supply, the method including the following steps performed before the step of installing the screw compressor, determining the status of the power supply; determining the excitation voltage of the at least one sensor; determining the status of the at least one sensor connection and determining the status of the signals.

8. A method for predicting and detecting the condition of a compressor having at least one rotative element, the method comprising the following steps:

storing in a data memory a predetermined logic routine, which includes a fast Fourier transform algorithm;

storing in the data memory, at least one key frequency value of the at least one rotative element for each of the different predetermined operating states of the compressor;

switching the compressor from an actual compressor operating state and operating the compressor in a predetermined operational state;

sensing the mechanical motion of the at least one rotative element and collecting vibration data at predetermined time intervals;

processing the collected vibration data into at least one vibration footprint using the predetermined logic routine for each of the at least one rotative elements;

converting each of the at least one vibration footprints to a corresponding electrical signal and storing each of the corresponding electrical signals within the data memory;

correlating each of the previously stored at least one key frequency values at the operating state, with a corresponding vibration footprint;

comparing each of the at least one vibration footprints with the corresponding at least one stored key frequency value to determine whether each of the at least one vibration footprints is within the acceptable range of the corresponding at least one stored key frequency value of the at least one rotative element and comparing the vibration footprints with the vibration footprints generated during previous time intervals to reveal trends in the vibratory condition of the compressor;

decreasing the length of the regular interval between trending steps if the compressor experiences a negative deviation in the vibratory condition;

returning the compressor to the actual compressor operating state; and controlling the operation of the compressor in response to the determination whether each of the at least one vibration footprints is within an acceptable range for the compressor by outputting a command signal from the processor to the compressor, while the compressor is operating.

9. The method for predicting and detecting the condition of a compressor having at least one rotative element, as claimed in claim 8 further including the step of calibrating the processor at predetermined time intervals, while the compressor is operating.

10. The method for predicting and detecting the condition of a compressor having at least one rotative element, as claimed in claim 8 further including the step of initializing the processor at predetermined time intervals, while the compressor is operating.

* * * * *